United States Patent [19]
Anegawa

[11] Patent Number: 5,396,164
[45] Date of Patent: Mar. 7, 1995

[54] BATTERY CHARGING APPARATUS CAPABLE OF COMPLETELY CHARGING SECONDARY CELL IN SAFETY

[75] Inventor: Takao Anegawa, Kita-Kyushu, Japan
[73] Assignee: Kabushiki Kaisha Toshiba, Kawasaki, Japan
[21] Appl. No.: 138,186
[22] Filed: Oct. 20, 1993
[30] Foreign Application Priority Data
  Oct. 20, 1992 [JP] Japan .................. 4-281777
[51] Int. Cl.$^6$ .............................................. H02J 7/10
[52] U.S. Cl. .................................. 320/21; 320/39
[58] Field of Search ................ 320/20, 21, 22, 23, 320/24, 39, 40

[56] References Cited
U.S. PATENT DOCUMENTS

| | | | |
|---|---|---|---|
| 3,781,631 | 12/1973 | Nelson et al. | 320/39 X |
| 4,321,523 | 3/1982 | Hammel | 320/21 X |
| 4,354,148 | 10/1982 | Tada et al. | 320/20 |
| 5,214,369 | 5/1993 | McCrea | 320/21 |

Primary Examiner—Kristine L. Peckman
Attorney, Agent, or Firm—Foley & Lardner

[57] ABSTRACT

Battery charging apparatus is provided between a power source and a secondary cell which charges the secondary cell by direct current (DC) power. The apparatus includes a power generation circuit for generating the DC power, a pulse generation circuit for generating a pulse voltage having a predetermined cycle, a first voltage level and a second voltage level, each continuing for a predetermined period after the start of the supply of the DC power. A switch selectably connects the DC power such that the DC power is supplied to the secondary cell while the pulse voltage is at the first voltage level, and interrupts the supply of the DC power to the secondary cell while the pulse voltage is at the second voltage level. A detection circuit detects the voltage of the secondary cell to check the remaining capacity of the secondary cell while the supply of the DC power to the secondary cell is interrupted. A control element which is controlling the charging operation, stops the charging of the secondary cell by setting the pulse voltage to the second voltage level when charging is determined to be sufficient, on the basis of the detected voltage of the secondary cell.

9 Claims, 6 Drawing Sheets

BATTERY CHARGING APPARATUS CAPABLE OF COMPLETELY CHARGING SECONDARY CELL IN SAFETY

BACKGROUND OF THE INVENTION

The present invention relates to a battery charging apparatus for a secondary cell.

Secondary cells mean batteries in which, even though they once charge current (so-called primary operation), they can be used again by returning to an original situation by means of charging (secondary operation). The secondary cells are also called storage batteries which are assembled to include two or more than two cells connected to one another in a manner to store electrical energy. Since it is possible to store energy again by charging the apparatus which once discharged the stored energy by discharging, it is possible to continuously use the assembly by repeating a charge/discharge cycle. There are well known batteries of this kind such as lead storage batteries, alkali storage batteries and cadmium storage batteries.

Two systems are conventionally known for charging systems for the secondary cell. One is a charging system for ordinarily causing current to flow in the secondary cell by operating the battery charging apparatus, and the other is a charging system installing a timer causing the charging system to start charging the secondary cell and to stop a charging operation after passing through a predetermined time by the timer.

In the former case, when the charging system is operated, the system continues supplying a charge current in one direction despite a condition of the secondary cell such as an over-discharge or under-discharge, thereby generating an overcharge so as to heat the cell. Accordingly, it is possible that heat causes a fire and gas occurring in the secondary cell can result in an explosion.

On the other hand, a charge generally starts under the condition that the discharge amount of the secondary cell to be charged is not detected. Therefore, in the latter system, when the discharge amount of the secondary cell is proper with respect to a set time (for example, thirteen hours) of the timer, there is no problem because an over-charge does not occur until a set time $T_1$ as shown by graph $h_1$ in FIG. 1. However, when the discharge amount is small, an overcharge condition can exist before the set time $T_1$ passes through as shown by graph $h_2$ in FIG. 1. For example, after ten hours from the start of charging, there is an overcharge condition (an oblique lined portion of the graph $h_2$ in FIG. 1). Since the charging operation does not stop until the set time passes through, the secondary cell is heated and gas occurs, thereby resulting an danger of explosion of the secondary cell.

SUMMARY OF THE INVENTION

In view of the above-mentioned conditions, an object of the present invention is to provide battery charging apparatus for a secondary cell, which is capable of completely charging the secondary cell in safety.

Battery charging apparatus according to the present invention is characterized in comprising power generation means for generating the DC power for charging; switch means provided between the power generation means and the secondary cell for providing an intermittent a supply of the DC power from the power generation means; voltage detection means provided between the switch means and the secondary cell for detecting a voltage of the secondary cell in order to check remaining capacity of the secondary cell; pulse generation means for generating a pulse voltage having continuity, a predetermined cycle and first and second voltage levels each having a predetermined period in synchronous with a start of said supply of the DC power from the power generation means; and control means for controlling charging, by means of repetition of charging operation and interrupting/detecting operation under a condition where a detected voltage of the secondary cell is less than a set value, the charging operation in which the supply of the DC power continues by turning on the switch means while the pulse voltage generated by the pulse generation means is the first voltage level, the interrupting/detecting operation in which the supply of the DC power is interrupted and the detection means detects the voltage of the secondary cell while the pulse voltage is the second voltage level, and by means of a stop of pulse generating operation of the pulse generation means under a condition where the detected voltage of the secondary cell is more than the set value.

By the battery charging apparatus for a secondary cell according to the present invention which is above-constructed, the DC power supplied from the power generation means is intermittently supplied to the secondary cell by the switch means. Further, when operation of the switch means is an OFF condition, the present potential of the secondary cell is detected by the control means, and charging operation stops by controlling the switch means on the basis of the detected value with respect to the present potential. By this, it is possible to completely charge the secondary cell in safety.

Accordingly, the present invention can charge completely and in safety the secondary cell.

DETAILED DESCRIPTION OF THE PREFERRED EMBODIMENTS

There will be described in detail battery charging apparatus according to preferred embodiments of the present invention in reference to the attached drawings.

Figure 1:
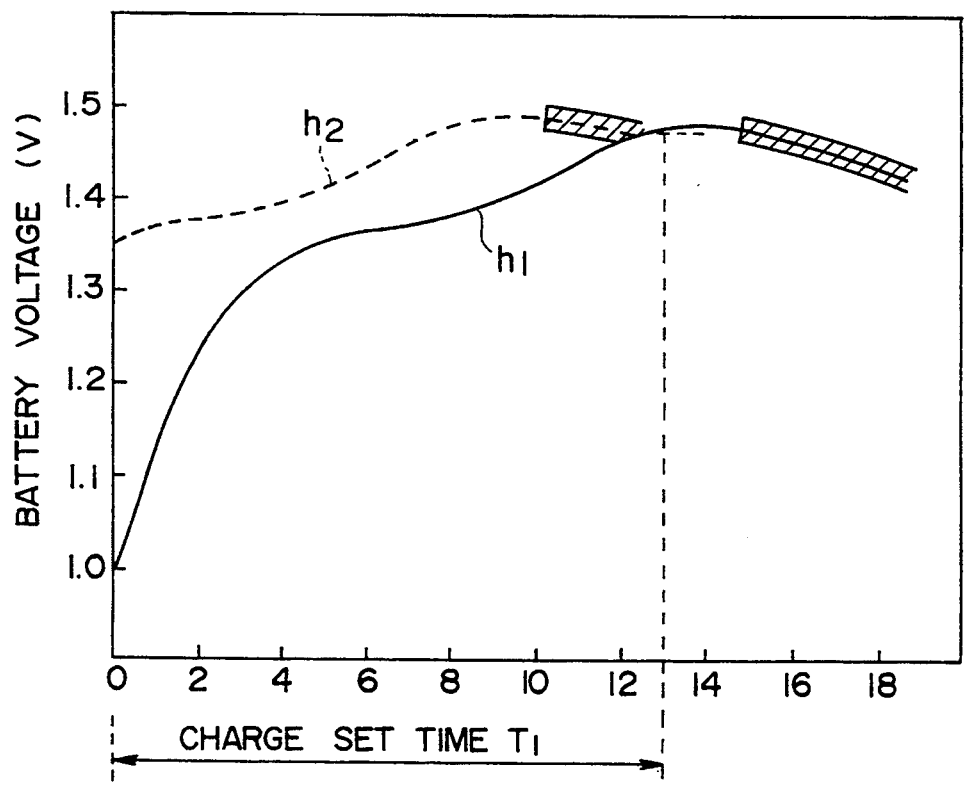
FIG. 1 is a characteristic diagram showing a charge characteristic of the conventional battery charging apparatus for the secondary cell.
Figure 2:
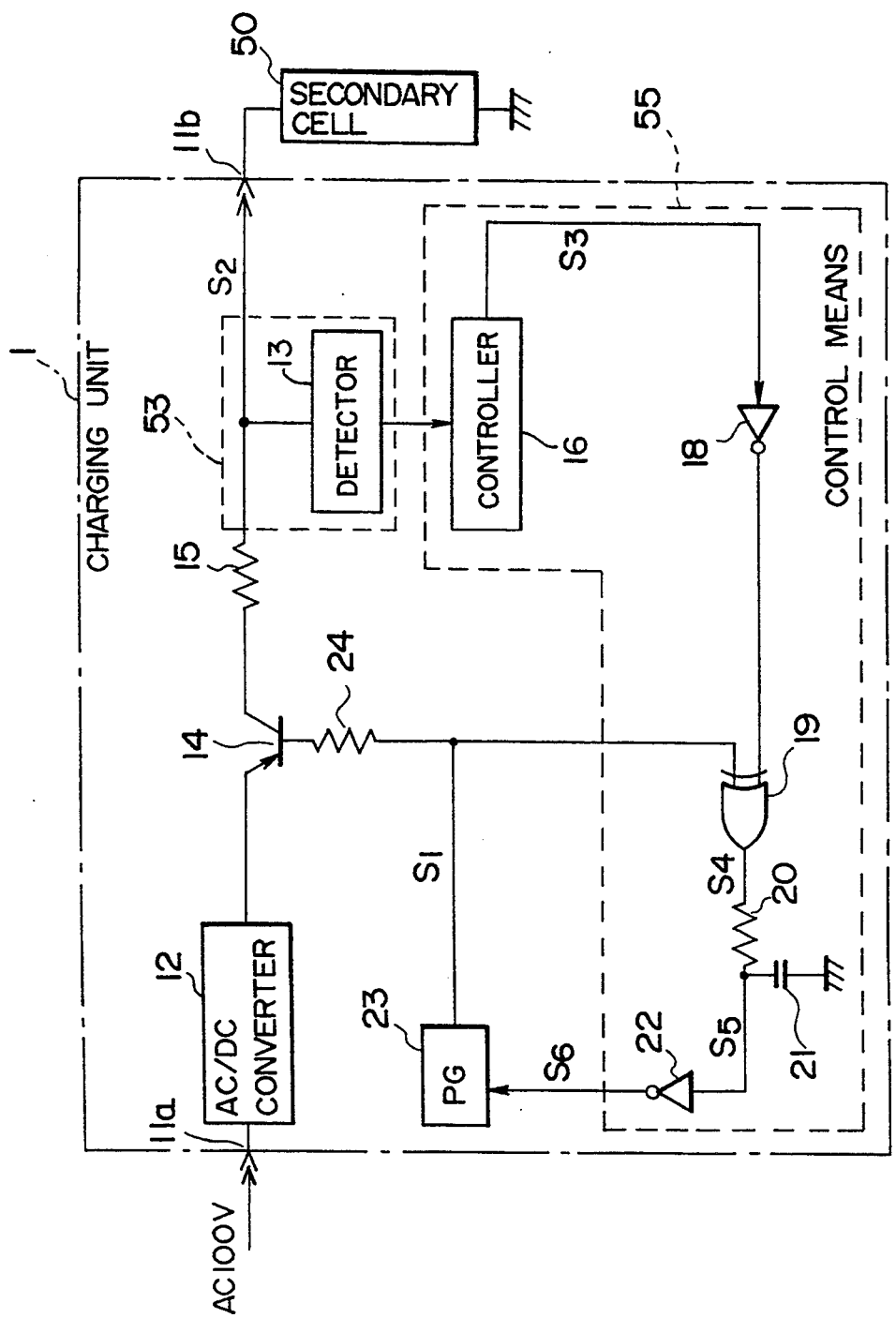
FIG. 2 is a block diagram showing a constitution of the battery charging apparatus for a secondary cell according to a first embodiment of the present invention.
Figure 4:
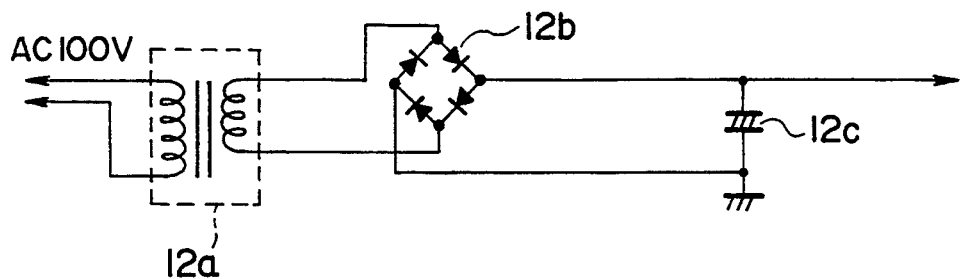
FIG. 4 is a circuit diagram showing an example of an AC/DC converter provided in the battery charging apparatus according to the present invention.

FIG. 2 shows a configuration of a charging unit 1 for a secondary cell 50 according to a first embodiment of the present invention. The charging unit 1 of the first embodiment comprises connecters 11a and 11b, an alternating current (AC)/direct current (DC) converter 12, a detector 13 for detecting a voltage of the secondary cell 50, a PNP-type transistor 14 for switching, resistors 15, 20 and 24, controller 16, inverters 18 and 22, an exclusive OR circuit 19, a capacitor 21, and a pulse generating circuit (called as a PG in the figure). The AC/DC converter 12 converts an AC power (for example, AC 100 V) supplied through the connecter 11a into DC power, and comprises as shown in FIG. 4, a transformer 12a for transforming the AC power, a rectifier circuit 12b for rectifying a transformed AC, and a smoothing capacitor 12c for smoothing an output of the rectifier circuit 12b. The transistor 14 causes an output of the AC/DC converter 12 to convey through the resistor 15 and the connecter 12b to the secondary cell 50 to be charged, on the basis of a pulse signal $S_1$ which is outputted from the pulse generating circuit 23 described later.

The controller 16 samples a capacity (a present voltage) $S_2$ of the secondary cell 50 at a predetermined time (for example, few minutes) interval, calculates the difference between the present sampling value and the immediately previous sampling value, and outputs a stop instruction signal $S_3$ for stopping charging of the secondary cell 50 in the case where the difference becomes equal to or less than a predetermined value. The inverter 18 inverts the stop instruction signal $S_3$ outputted from the controller 16. The exclusive OR circuit 19 operates in response to an output signal of the inverter 18 and an output signal of the pulse generating circuit 23, and outputs an operation signal $S_4$ through the resistor 20 and the capacitor 21 to the inverter 22. The inverter 22 inverts an operation signal $S_5$ which is obtained through the resistor 20 and the capacitor 21 from the exclusive OR circuit 19, and transmits an inverted signal $S_6$ to the pulse generating circuit 23. The controller 16, inverter 18, exclusive OR circuit 19, resistor 20, capacitor 21 and inverter 22 constitute control means 55. Voltage detection means 53 including the detector 13 detects a potential of a connection point of the connecter 11b and the resistor 15.

Figure 5:
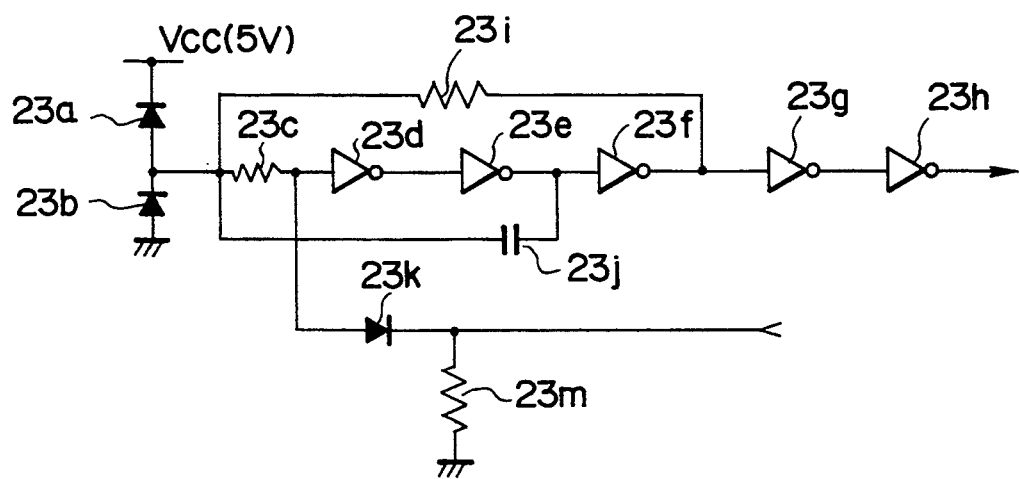
FIG. 5 is a circuit diagram showing an example of a pulse generating circuit provided in the battery charging apparatus according to the present invention.

The pulse generating circuit 23 is a CR-type pulse generating circuit comprising, as shown in FIG. 5, diodes 23a, 23b and 23k, resistors 23c, 23i and 23m, and inverters 23d, 23e, 23f, 23g and 23h, and generates a pulse signal $S_1$ having a duty proportion such as "1" and a cycle such as 200 msec. The pulse signal $S_1$ has an "L" level of 0 V (zero volts) and an "H" level of 5 V (five volts). Furthermore, the pulse generating circuit 23 continues outputting the pulse signal $S_1$ until the controller 16 outputs the stop instruction signal $S_3$.

Figure 3:
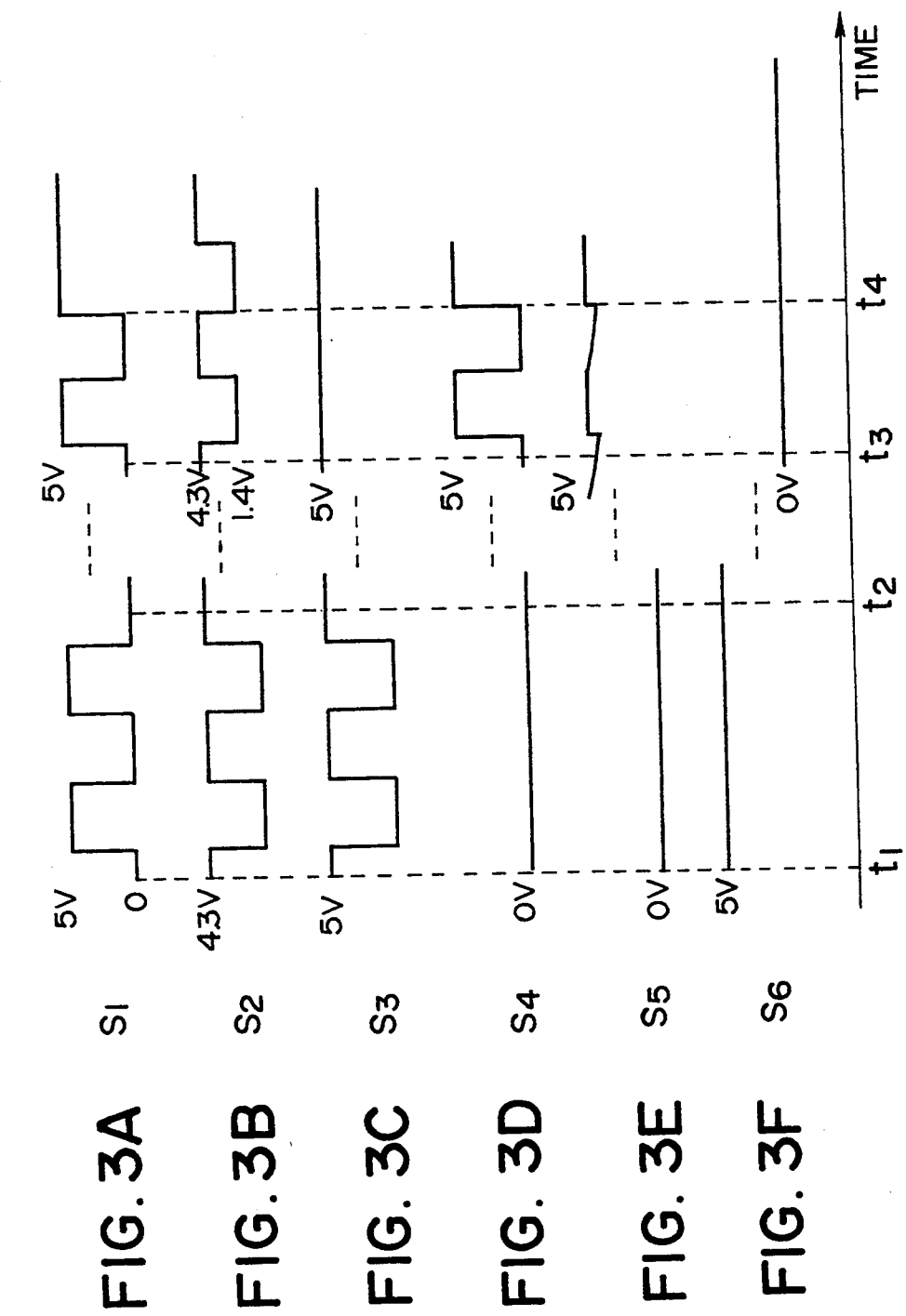
FIGS. 3A–3F are timing charts respectively showing signal waveforms for describing operation of the battery charging apparatus of the present invention.

Next, there will now be described operation of the battery charging apparatus according to the first embodiment in reference with FIG. 3. The charging unit 1 is connected to an AC power source (not shown) through the connecter 11a, and to the secondary cell 50 through the connecter 11b. When a switch (not shown) provided in the charging unit 1 is turned on, the AC/DC converter 12 converts AC power into DC power, and at the same time, the pulse generating circuit 23 outputs the pulse signal $S_1$ as shown in FIG. 3A. The transistor 14 supplies DC power converted by the AC/DC converter 12 through the resistor 15 to the secondary cell 50 for charging when the pulse signal $S_1$ of the PG 23 is "L" level. When the pulse signal $S_1$ is "H" level, the above-mentioned charging operation is not performed. Accordingly, operation of charging—pause—charging — ... is repeated in accordance with the level of the pulse signal $S_1$ (refer time $t_1$–$t_2$ shown in FIG. 3A).

On the other hand, during the pause period, the controller 16 samples the present voltage of the secondary cell 50 at a predetermined cycle. Timing of the sampling coincides with timing at which charging operation is suspended, namely, when the level of the pulse signal $S_1$ is "H" level. When the absolute value of the difference between the present sampling value and an immediately previous sampling value is more than a predetermined value (such as 0.05 V), namely, when charging operation can be still performed, the controller 16 outputs an inverted signal $S_2$ as a pulse signal which is generated by converting and synchronizing with the pulse signal $S_1$. In contrast, when the absolute value of the difference between the present sampling value and the immediately previous sampling value is equal to or less than the predetermined value (0.05 V), namely, when charging operation is completed, the controller 16 outputs a stop instruction signal $S_3$ having an "H" level.

The signal $S_3$ outputted from the controller 16 is supplied through the inverter 18 to the exclusive OR circuit 19 which calculates an exclusive OR between the pulse signals $S_1$ and $S_3$. Accordingly, during the time period while operation charging—pause—charging— ... is performed (for example, period of time $t_{1-t2}$ as shown in FIGS. 3A–3D), the exclusive OR circuit 19 outputs a signal $S_4$ having an "L" level. By this, a signal $S_5$ also becomes an "L" level, and a signal $S_6$ becomes an "H" level. The signal $S_5$ is supplied through the resistor 20 and capacitor 21 to the inverter 22, and the signal $S_6$ is supplied from the inverter 22 to the pulse generating circuit 23. When the level of the signal $s_6$ is an "H" level, the pulse generating circuit 23 continues generating the pulse signal.

Charging operation is performed as described above. The closer the voltage of the secondary cell 50 approaches to a standard capacity (such as 1.2 V), the smaller step by step the difference between the present sampling value and the immediately previous sampling value of the secondary cell 50 both of which are sampled by the controller 16 becomes. When the difference becomes equal to or less than the predetermined value at a predetermined point, the controller 16 outputs the stop instruction signal for stopping charging operation, namely, the signal $S_3$ having an "H" level is outputted (refer a time $t_3$ as shown in FIG. 3C). The signal $S_3$ is inverted by the inverter 18 to output to the exclusive OR circuit 19. At this time, since the pulse generating circuit 23 outputs the pulse signal $S_1$, the signal $S_4$ as the output of the exclusive OR circuit 19 has the same waveform as the pulse signal $S_1$. However, a signal $S_5$ supplied to the inverter 22 becomes an "H" level as shown in FIG. 3E by means of the resistor 20 and the capacitor 21. The inverter 22 supplies a signal having an "L" level to the pulse generating circuit 23 to make it stop generating operation, thereby causing the output signal $S_1$ to be an "H" level (refer a time $t_4$ shown in FIG. 3D). At this time, since the output of the inverter 18 is an "L" level, the output $S_4$ of the exclusive OR circuit 19 completely becomes an "H" level and the signal $S_6$ outputted from the inverter 22 becomes an "L" level, so that the pulse generating circuit 23 continues stopping generating operation so as to stop charging operation (refer a period after time $t_4$ shown in FIG. 3D).

As has been described above, the first embodiment of the present invention can charge perfectly the secondary cell in safety.

Figure 6:
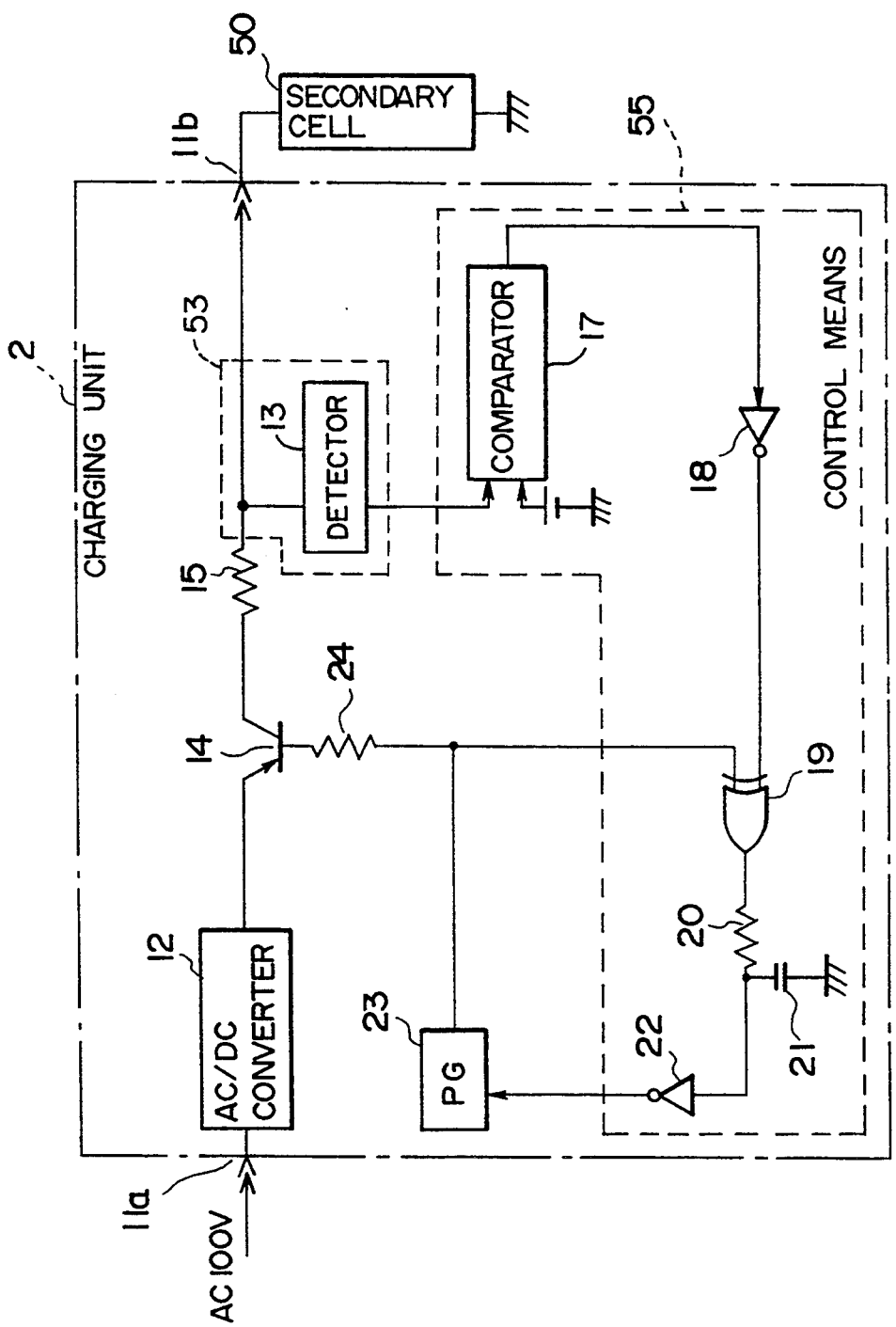
FIG. 6 is a block diagram showing a construction of battery charging apparatus for a secondary cell according to a second embodiment of the present invention.

Next, there is described a configuration of a battery charging system according to a second embodiment of the present invention in reference with FIG. 6. A charging unit 2 of the second embodiment comprises a comparator 17 in place of the controller 16 of the charging unit 1 in the first embodiment. The detector 13 included in the voltage detection means 53 detects the present potential of the secondary cell 50 during the pause period of charging operation of the transistor 14 so as to output it to the comparator 17, namely, when the pulse signal outputted from the pulse generating circuit 23 is an "H" level. When a detected voltage value of the secondary cell 50 is over a predetermined value, the comparator 17 outputs the stop instruction signal (an "H" level) for stopping generating operation of the pulse generating circuit 23. In contrast, when the detected value is less than the predetermined value, the comparator 17 outputs the signal having an "L" level. The charging unit 2 of the second embodiment constructed above has the same effect as the charging unit 1 of the first embodiment. The voltage detection means 53 has the same constitution as that of the first embodiment, and the control means 55 has a constitution in which the comparator 17 is replaced with the control means 16 in the first embodiment.

Figure 7:
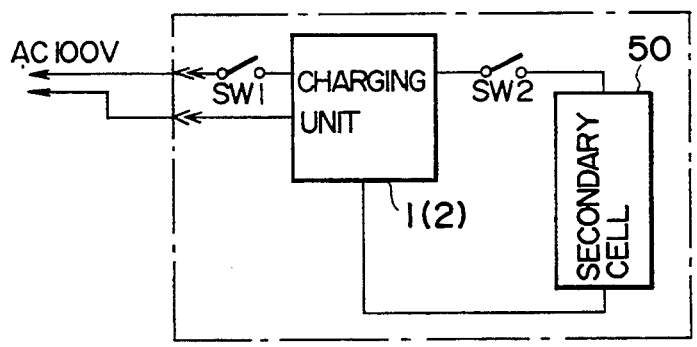
FIG. 7 is a block diagram showing a modified example of the battery charging apparatus according to the first or second embodiment of the present invention.

Even though the charging unit 1 or 2 in the first or second embodiment uses the connecter 11a for connecting with the AC power source and the connecter 11b for connecting with the secondary cell 50, the unit 1 or 2 may use switches $SW_1$ and $SW_2$, as shown in FIG. 7, which are interlocking with each other and in place of the connecters 11a and 11b.

Figure 8:
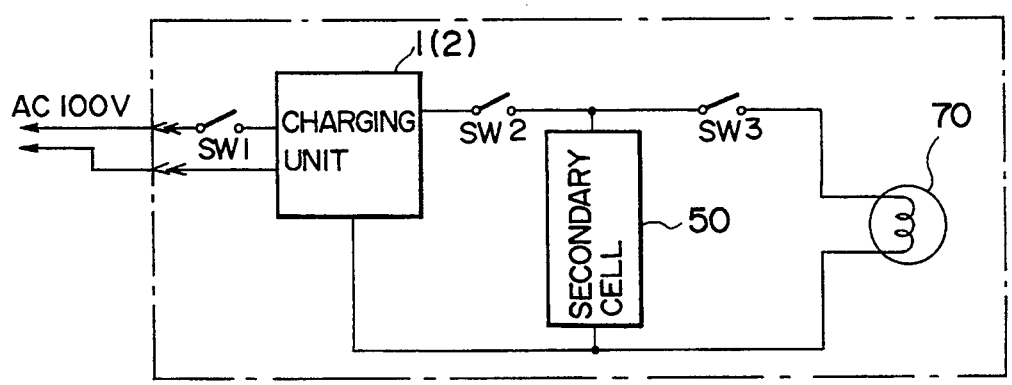
FIG. 8 is a block diagram showing an applied example of the battery charging apparatus of the present invention.

Furthermore, as shown in FIG. 8, the charging units 1 and 2 in the first and second embodiments can be applied in an electric light with a battery charge system. In FIG. 8, switches $SW_1$ and $SW_2$ are provided for charging and be interlocking with each other, and a switch $SW_3$ is provided for turning on and off a light 70.

Figure 9:
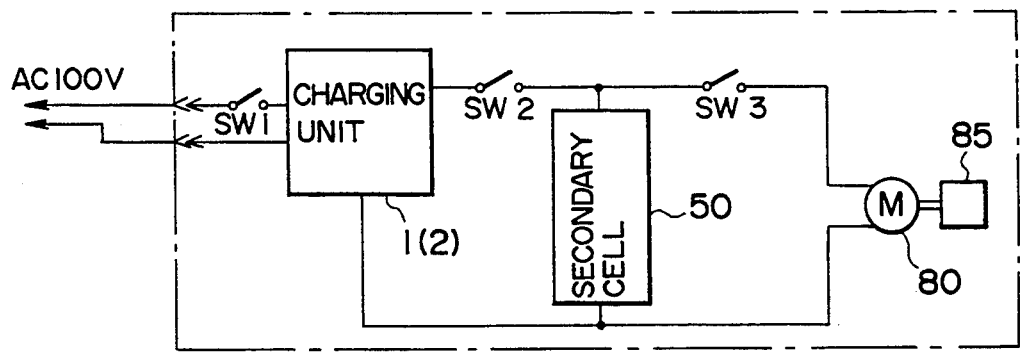
FIG. 9 is a block diagram showing another applied example of the battery charging apparatus of the present invention.

Still furthermore, as shown in FIG. 9, the charging units 1 and 2 in the first and second embodiments can be applied in an electric shaver with a battery charge system lamp. In FIG. 9, switches $SW_1$ and $SW_2$ are provided for charging and be interlocking with each other, and a switch $SW_3$ is provided for turning on and off a motor 80 which drives a razor blade 85 for shaving.

What is claimed is:
1. Battery charging apparatus connected between a power source and a secondary cell for supplying direct current (DC) power to the secondary cell, comprising:
   1) power generation means for generating said DC power for charging;
   2) switch means provided between said power generation means and said secondary cell for intermittently supplying said DC power from said power generation means;
   3) voltage detection means provided between said switch means and said secondary cell for detecting a voltage of said secondary cell in order to check A remaining capacity of said secondary cell;
   4) pulse generation means for generating a pulse voltage having a predetermined cycle and first and second voltage levels each having a predetermined period synchronized with a start of said supply of said DC power from said power generation means; and
   5) control means for controlling said charging, by means of repeating a charging operation and an interrupting/detecting operation when said detected voltage of said secondary cell is less than a set value, wherein when said pulse voltage generated by said pulse generation means is at said first voltage level, said charging operation supplies said DC power by turning on said switch means, and when said pulse voltage is at said second voltage level, said interrupting/detecting operation is performed in which said supply of said DC power is interrupted and said detection means detects said voltage of said secondary cell, and by means of stopping pulse generating operation of said pulse generation means when said detected voltage of said secondary cell is more than said set value,
   wherein said control means comprises,
     a) a controller which samples said voltage of said secondary cell which is detected by said voltage detection means at a predetermined time interval, calculates a difference between a present sampling voltage and an immediately previous sampling voltage, and outputs a stop instruction signal for stopping said charging of said secondary cell when an absolute value of said voltage difference becomes less than a predetermined value,
     b) a first stage inverter for outputting a first inverted signal which is generated by inverting said stop instruction signal,
     c) an exclusive OR circuit providing an exclusive OR output of a first input and a second input, said first input being said pulse voltage outputted from said pulse generation means, and said second input being said inverted signal outputted from said first stage inverter,
     d) a resistor having a first end which is connected in series to an output terminal of said exclusive OR circuit,
     e) a capacitor which is connected in series to a second end of said resistor and ground, and
     f) a second stage inverter for generating a second inverted signal which is generated by inverting a signal representing an output supplied from said exclusive OR circuit through said resistor and said capacitor, and for transmitting said second inverted signal to said pulse generation means.
2. The battery charging apparatus according to claim 1 wherein
   said power generation means comprises an alternating current/direct current (AC/DC) converter including a transformer for performing a voltage transformation with respect to alternating current (AC) power, a rectifier circuit for rectifying the transformed AC power, and a smoothing capacitor for outputting said DC power after smoothing an output of said rectifier circuit.

3. The battery charging apparatus according to claim 1 wherein said pulse generation means comprises:
   first and second diodes which are connected in series with each other to form a serial body which is connected between a constant voltage bus and ground;
   a first resistor connected at one end with a first connection point connecting said first diode with said second diode;
   first through fifth inverters which are connected in series and in order to another end of said first resistor;
   a second resistor which is connected with a second connection point and a third connection point, said second connection point which is provided for connecting said first connection point with said first resistor and said third connection point which is provided for connecting said third inverter with said fourth inverter;
   a capacitor connected in parallel between said second connection point and a fourth connection point which is provided for connecting said second inverter with said third inverter;
   a third diode connected in series between said control means and a fifth connection point which is provided for connecting said first resistor with said first inverter; and
   a third resistor connected between ground and a sixth connection point which is provided for connecting said control means and said third diode, said sixth connection point being electrically connected to receive said second inverted signal from said control means.

4. The battery charging apparatus according to claim 1 wherein
   said voltage detection means detects as said voltage of said secondary cell, a voltage of a connection point during a pause of said charging operation, said connection point is provided to electrically connect said secondary cell with a resistor which is provided between said secondary cell and said switch means, and said connection point is also electrically connected to said control means.

5. Battery charging apparatus connected between a power source and a secondary cell for supplying direct current (DC) power to the secondary cell, comprising:
   1) power generation means for generating said DC power for charging;
   2) switch means provided between said power generation means and said secondary cell for intermittently supplying said DC power from said power generation means;
   3) voltage detection means provided between said switch means and said secondary cell for detecting a voltage of said secondary cell in order to check a remaining capacity of said secondary cell;
   4) pulse generation means for generating a pulse voltage having a predetermined cycle and first and second voltage levels each having a predetermined period synchronized with a start of said supply of said DC power from said power generation means; and
   5) control means for controlling said charging, by means of repeating a charging operation and an interrupting/detecting operation when said detected voltage of said secondary cell is less than a set value, wherein when said pulse voltage generated by said pulse generation means is at said first voltage level, said charging operation supplies said DC power by turning on said switch means, and when said pulse voltage is at said second voltage level, said interrupting/detecting operation is performed in which said supply of said DC power is interrupted and said detection means detects said voltage of said secondary cell, and by means of stopping pulse generating operation of said pulse generation means when said detected voltage of said secondary cell is more than said set value,
   wherein said control means comprises,
   a) a comparator which compares said voltage of said secondary cell which is detected by said voltage detection means with a reference voltage, and outputs a stop instruction signal for stopping said charging of said secondary cell when said voltage of said secondary cell becomes more than said reference voltage;
   b) a first stage inverter for outputting a first inverted signal which is generated by inverting said stop instruction signal;
   c) an exclusive OR circuit for obtaining an exclusive OR output of a first input and a second input, said first input which is said pulse voltage outputted from said pulse generation means, and said second input which is said inverted signal outputted from said first stage inverter;
   d) a resistor having a first end which is connected in series to an output terminal of said exclusive OR circuit;
   e) a capacitor which is connected in series to a second end of said resistor and ground; and
   f) a second stage inverter for generating a second inverted signal which is generated by inverting a signal representing an output supplied from said exclusive OR circuit through said resistor and said capacitor, and for transmitting said second inverted signal to said pulse generation means.

6. The battery charging apparatus according to claim 5 wherein
   said control means further comprises a controller which samples a present voltage of said secondary cell, and stops said charging operation when a difference between said present sampling voltage and an immediately previous sampling voltage becomes smaller than a predetermined value.

7. The battery charging apparatus according to claim 5 wherein
   said power generation means comprises an alternating current/direct current (AC/DC) converter including a transformer for performing a voltage transformation with respect to alternating current (AC) power, a rectifier circuit for rectifying the transformed AC power, and a smoothing capacitor for outputting said DC power after smoothing an output of said rectifier circuit.

8. The battery charging apparatus according to claim 5 wherein said pulse generation means comprises:
   first and second diodes which are connected in series with each other to form a serial body which is connected between a constant voltage bus and ground;
   a first resistor connected at one end at a first connection point connecting said first diode with said second diode;
   first through fifth inverters which are connected in series and in order to another end of said first resistor;

a second resistor which is connected with a second connection point and a third connection point, said second connection point which is provided for connecting said first connection point with said first resistor and said third connection point which is provided for connecting said third inverter with said fourth inverter;

a capacitor connected in parallel between said second connection point and a fourth connection point which is provided for connecting said second inverter with said third inverter;

a third diode connected in series between said control means and a fifth connection point which is provided for connecting said first resistor with said first inverter; and a third resistor connected between ground and a sixth connection point which is provided for connecting said control means and said third diode, said sixth connection point being electrically connected to receive said second inverted signal from said control means.

9. The battery charging apparatus according to claim 5 wherein said voltage detection means detects as said voltage of said secondary cell, a voltage of a connection point during a pause of said charging operation, said connection point is provided to electrically connect said secondary cell with a resistor which is provided between said secondary cell and said switch means, and said connection point is also electrically connected to said control means.

* * * * *